United States Patent
Fahldieck

(10) Patent No.: US 9,604,791 B2
(45) Date of Patent: Mar. 28, 2017

(54) METHOD FOR TRANSPORTING CONTAINERS WITH GRIPPING ACTION ON A HANDLING AND TRANSPORTING APPARATUS AND CONTAINER AND TRANSPORT APPARATUS HAVING SELF-ADAPTIVE GRIPPING ELEMENTS

(71) Applicant: Andreas Fahldieck, Idar-Oberstein (DE)

(72) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 14/633,840

(22) Filed: Feb. 27, 2015

(65) Prior Publication Data
US 2015/0217948 A1    Aug. 6, 2015

Related U.S. Application Data

(63) Continuation-in-part of application No. PCT/EP2013/002389, filed on Aug. 9, 2013.

(30) Foreign Application Priority Data

Aug. 29, 2012 (DE) ......................... 10 2012 017 048

(51) Int. Cl.
*B65G 47/86* (2006.01)

(52) U.S. Cl.
CPC .... *B65G 47/847* (2013.01); *B65G 2201/0244* (2013.01)

(58) Field of Classification Search
CPC ..... B65G 47/846; B65G 47/847; B65G 47/90
(Continued)

(56) References Cited

U.S. PATENT DOCUMENTS

| 4,651,879 A | 3/1987 | Harris et al. |
| 4,984,680 A * | 1/1991 | Hamano ............... B65G 47/847 198/803.9 |

(Continued)

FOREIGN PATENT DOCUMENTS

| DE | 296 07 868 | 6/1997 |
| DE | 198 30 456 | 6/1999 |

(Continued)

OTHER PUBLICATIONS

PCT/ EP2013/002389 International Search Report dated Dec. 6, 2013, and English translation thereof.
German Office Action 10 2012 017 048.3 dated Jan. 22, 2013.
PCT/ EP2013/002389 International Preliminary Report on Patentability dated Mar. 3, 2015, and English translation thereof.

*Primary Examiner* — James R Bidwell
(74) *Attorney, Agent, or Firm* — Nils H. Ljungman & Associates

(57) ABSTRACT

A method for transporting containers using a handling and transporting apparatus comprising two transporting elements, and a gripping element and force introduction elements disposed on one of the transporting elements. A container is transported between the transporting elements at a transfer region by opening the gripping element and either releasing or receiving the container. The gripping element is closed to grip the container. In order to open or close the gripping element, a control element of a gripping finger of the gripping element is engaged with a control structure to pivot a base element of the gripping finger. Upon pivoting, a gripping region of the gripping finger is pressed against one of a pair of force introduction elements to thereby deform the gripping region into a sickle shape.

20 Claims, 5 Drawing Sheets

(58) Field of Classification Search
USPC .............................. 198/470.1, 803.9, 803.7
See application file for complete search history.

(56) References Cited

U.S. PATENT DOCUMENTS

| | | | |
|---|---|---|---|
| 5,743,377 A | | 4/1998 | Kronseder |
| 6,079,541 A * | | 6/2000 | Bercelli ................ B08B 9/426 198/377.03 |
| 8,602,471 B2 * | | 12/2013 | Bodtlander .......... B65G 47/847 198/803.6 |
| 8,833,824 B2 * | | 9/2014 | Fahldieck ............ B65G 47/847 198/468.5 |
| 2008/0210520 A1 * | | 9/2008 | Legallais ............. B65G 47/847 198/470.1 |

FOREIGN PATENT DOCUMENTS

| | | |
|---|---|---|
| DE | 198 08 058 | 9/1999 |
| DE | 203 18 845 | 3/2004 |
| DE | 20 2005 002 924 | 3/2006 |
| DE | 10 2005 010 380 | 9/2006 |
| DE | 10 2005 014 838 | 10/2006 |
| DE | 10 2005 041 929 | 3/2007 |
| DE | 10 2007 017 416 | 6/2008 |
| DE | 10 2007 037 228 | 2/2009 |
| DE | 10 2009 015 977 | 9/2010 |
| EP | 1 040 999 | 10/2000 |
| EP | 1 203 640 | 5/2002 |

* cited by examiner

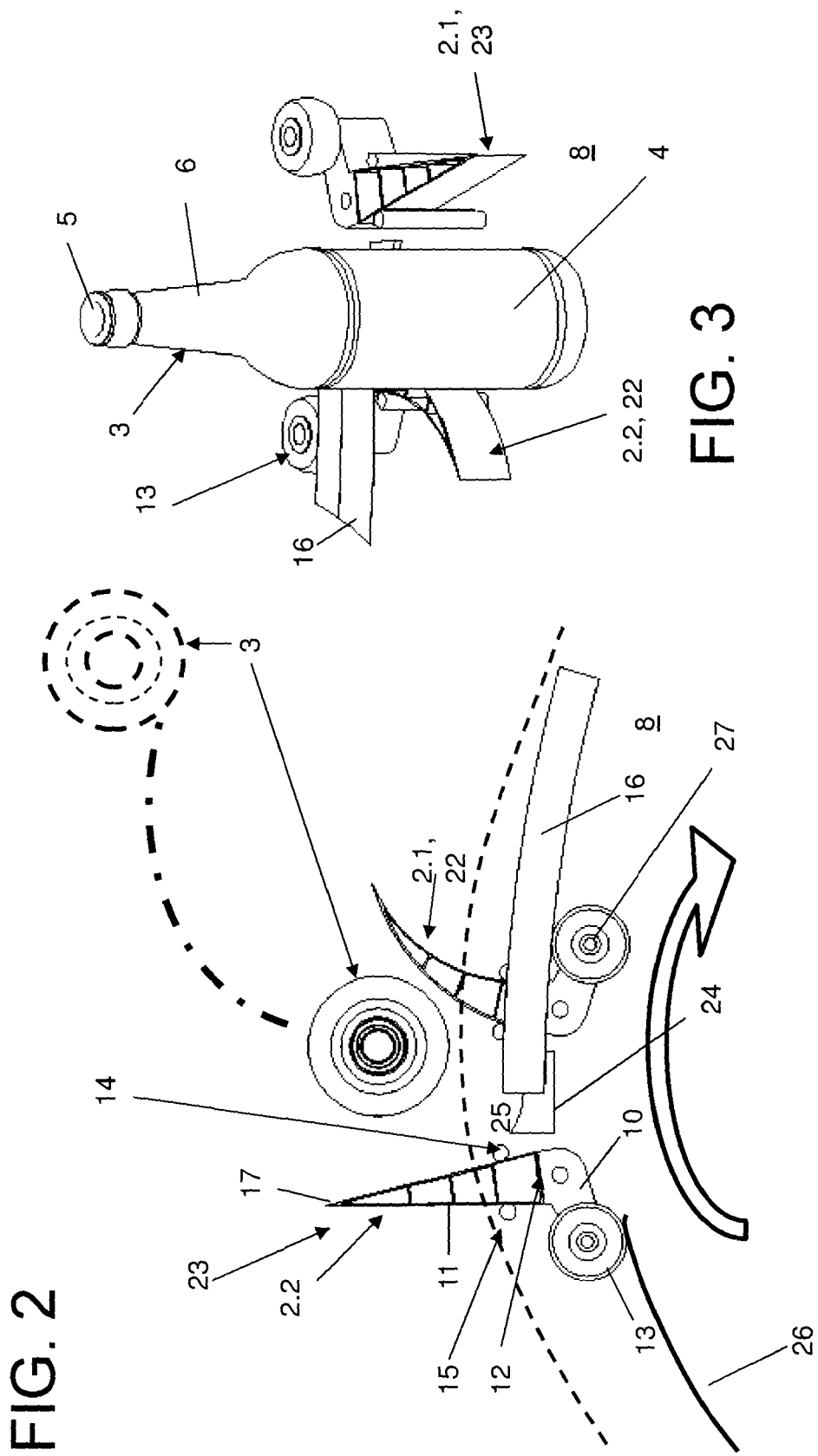

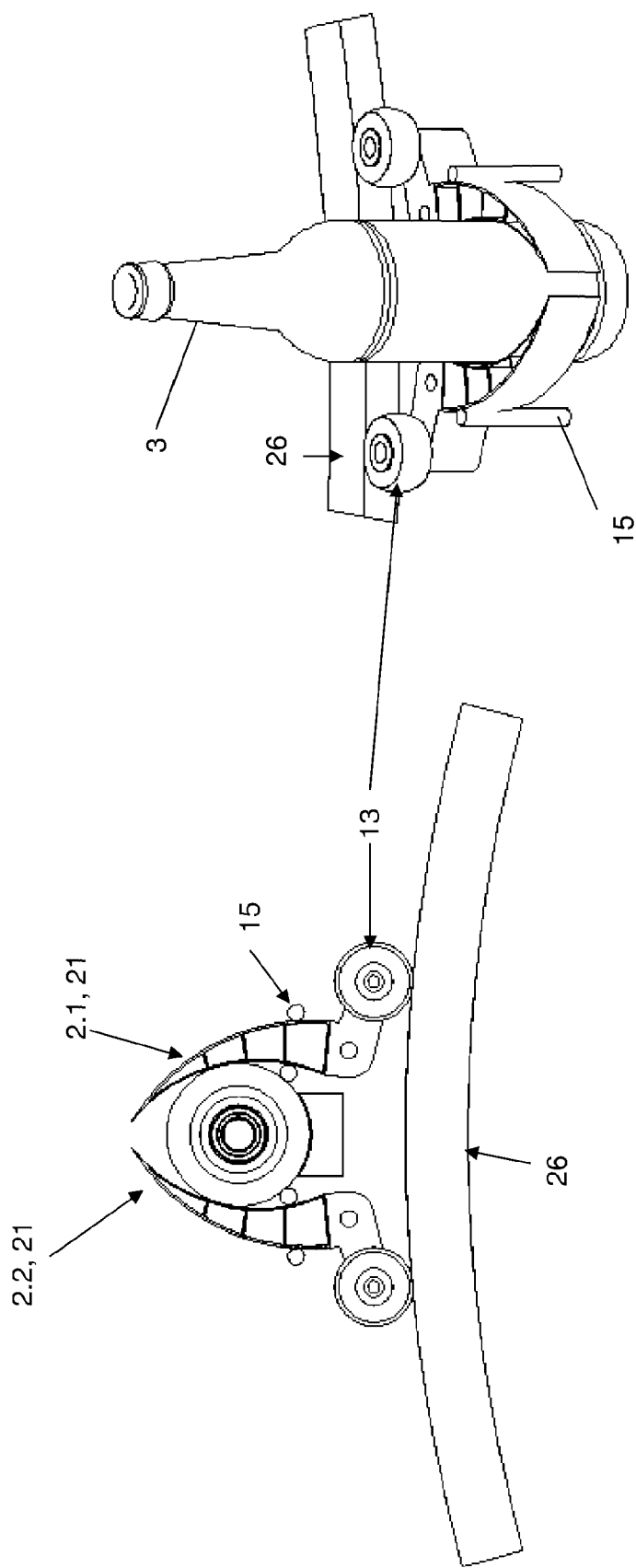

ated state in International Patent Application No. PCT/EP2013/002389.
METHOD FOR TRANSPORTING CONTAINERS WITH GRIPPING ACTION ON A HANDLING AND TRANSPORTING APPARATUS AND CONTAINER AND TRANSPORT APPARATUS HAVING SELF-ADAPTIVE GRIPPING ELEMENTS

CONTINUING APPLICATION DATA

This application is a Continuation-In-Part application of International Patent Application No. PCT/EP2013/002389, filed on Aug. 9, 2013, which claims priority from Federal Republic of Germany Patent Application No. 10 2012 017 048.3, filed on Aug. 29, 2012. International Patent Application No. PCT/EP2013/002389 was pending as of the filing date of this application. The United States was an elected state in International Patent Application No. PCT/EP2013/002389.

BACKGROUND

1. Technical Field

The present application relates to a method for transporting containers with gripping action on a handling and transporting apparatus and container and transport apparatus having self-adaptive gripping elements.

2. Background Information

Background information is for informational purposes only and does not necessarily admit that subsequently mentioned information and publications are prior art.

The present application relates to a method for transporting containers with gripping action on a handling and transporting apparatus, and a handling and transporting apparatus which is designed to implement the method and has at least one gripping element for retaining or gripping a container, wherein the container has a belly or body region, at the head end a closable mouth opening, and a neck region, and wherein the apparatus has at least one transfer region from one transporting element to another transporting element.

Some gripping elements are known, for example, as mechanically functioning gripping clamps, wherein the gripping force can be produced mechanically but also by means of magnets. The handling and transporting apparatus has as transporting elements, for example, transporting systems which are designed, by way of example, as inlet star elements, main star elements, and outlet star elements. Arranged between the inlet star element and the main star element and between the main star element and the outlet element is the respective transfer region, wherein the containers are transferred from the inlet star element to the main star element and from the main star element to the outlet star element.

Some clamps for holding containers, for example bottles, in container transporting and handling machines, have at least two clamp arms, which are movable relative to one another for opening and closing, wherein each clamp arm comprises a gripping arm and at least one clamping arm comprises a counter-arm. The clamping arm which comprises a gripping arm and counter-arm is formed as one piece, wherein the gripping arm is stable in form and the counter-arm is designed as elastic in form. This is intended to provide a clamp for holding containers which allows for the necessary and/or desired centering of the containers, and wherein, at the same time, container diameter tolerances can be compensated for.

A gripper for containers, such as for bottles in container transport systems or container handling machines, may comprise at least two gripping arms capable of moving relative to one another, which are provided with magnetically-interacting magnets or permanent magnets in the gripping direction. At the same time, the magnets or permanent magnets, which repel each other and attract each other, are formed in such a way, and arranged movable relative to one another by the working movement of the gripper, that the sum of the repelling and attracting forces taking effect in the gripping direction onto the gripping arms is essentially constant within a predetermined gripping range, which covers containers of different gripping sizes.

An apparatus for the gripping of containers and/or bottles with a carrier, may comprise a first gripping device arranged on the carrier, with a first gripping element movable in the direction of an outer circumference of the container, in order to grip the container at an outer circumference. The apparatus has a second gripping device arranged at the carrier, which can be introduced at least section by section into a mouth of the container, wherein the second gripping device comprises a second gripping element which can be moved in the direction of an inner circumference of the container, in order to grip the container from the inside. With such a device it is intended that, for example, bottles with bar closures can be gripped. Depending on which position the bar closure is arranged, either the first gripping element or the second gripping element grips.

A bottle gripper or, respectively, a gripping device for bottles, with two gripping arms, may be brought by a control cam into a retaining or releasing position, in that the control cam interacts with a contact surface formed at each gripping arm. The contact surface is in each case a constituent part of an elastic cushion, which is arranged at the respective gripping arm.

Another gripping apparatus for bottles may have two gripping arms which can be pivoted relative to one another by means of a drive device between a gripping position holding the bottles between them and a spread position releasing the bottle, wherein, by the drive device, a predetermined constant or substantially constant adjustment path is applied to a drive part taking effect on the gripping arms. The gripping arms are coupled to the drive part with the intermediate engagement of at least one elastically deformable buffer element, wherein the drive part, leaving an intermediate space, engages into an aperture of a gripping arm, and wherein the buffer element at least partially fills out the intermediate space.

A clamp gripper for a container transporting system, for example for a bottle transporting system with two gripping arms, may comprise an energy storage mechanism with at least one pair of mutually repelling magnets or permanent magnets.

From another sector of technology, for example, a "bionic handling assistant," i.e. a robot arm, which combines the attainments of nature with technology (bionics) can be used. The robot arm comprises an artificially driven power transfer structure, which comprises on the end side a driven gripping finger for gripping objects. The power transfer structure can carry out movements similar to those of an elephant's trunk. The Fin Ray Effect®, which describes a two-layer structure which carries out deformations shaped by the application of force, for example by giving way at the engagement point and, by the effect of the force, causes the ends of the structure to bend towards one another. This causes a shape adaptation to occur, whereby point loads are avoided and/or minimized or reduced. The effect is known, for example, for chair backs. The gripping fingers referred to heretofore can be designed in such a way that they engage flexibly in non-positive and positive fit around the object to be gripped. A gripping element arranged in accordance with the Fin Ray Effect® is known, whereby the gripping element is intended to grip objects with care. Some objects may exploit the Fin Ray Effect®.

Some sorting apparatus may comprise a two-dimensional power transfer structure, and some drive devices may comprise a three-dimensional power transfer structure. Some gripping tools may comprise self-adaptive kinematics, while some handling apparatus similar to this may comprise gripping apparatus for three-dimensional objects. In the hitherto unpublished DE 10 2011 013 299.6 from the Applicants, a self-adaptive gripping element is described. Hereinafter it is intended that, to serve as a basic definition and technical description of a self-adaptive gripper or gripping finger, the embodiments from DE 203 18 845 U1 and DE 10 2005 010 380 A1 are to be taken, which are hereby made the disclosure of this present application, inasmuch as no supplements or departures are formulated hereinafter.

Containers referred to in the introduction can be used, for example, as bottles for liquids, for example for beverages. The containers, such as bottles, can comprise for example glass or plastic, such as PET. It is also conceivable, however, that the containers can comprise other materials and be filled with other liquids.

Some container handling apparatuses are, for example, rinsers, fillers, closers, labeling machines, inspection machines, and the like, wherein container handling apparatuses or transporting devices can be of rotating or linear design, wherein both types possibly comprise circulating retaining devices. For example, a labeling machine comprises a labeling star element, a main star element, on which various devices may be arranged, and an outlet star element, which is inherently known and has already been referred to heretofore.

At the handling and transport apparatuses for containers, the respective containers are held in the retaining devices, i.e. the gripping elements, along the transport direction. For this purpose the containers, i.e. the bottles, for example, are held in the mouth area by means of the retaining devices, wherein the containers, i.e. the bottles, for example, can stand upright on, for example, rotating plates, or can even be transported in floating fashion. The containers can of course also be held in the belly region.

The containers may therefore comprise regions with different diameters. For example, a bottle has a greater diameter in its belly region than in its mouth region and its neck region. The respective holding devices are therefore designed adapted in their dimensions in each case to the respective holding purpose, i.e. to the container region which is to be transported or held in each case. If it is intended that other containers with divergent dimensions are to be held, the handling or transporting apparatus concerned requires and/or desires re-fitting to adapted holding apparatus or an appropriate adjustment of the already existing holding apparatus. Both procedures, i.e. the re-fitting or the adjustment, are not only time-consuming and therefore personnel costs-intensive, but also lead to substantial loss of production. In order for the bottle not to be deformed or even destroyed during gripping or holding, efforts also have to be made to counteract such an event.

In this situation, control elements can be provided which prevent, reduce, or minimize a further movement together of the opposed gripping elements, if, for example, a gripping element were to exhibit, instead of the dimensions for the belly region, the dimensions of the neck region. A further problem lies in the fact that the containers must be or may be guided with extremely high precision at the transfer from one transporting element to the other, following transporting element, which requires and/or desires substantial effort and expenditure on control.

OBJECT OR OBJECTS

Taking this as a basis, the present application is based on an object of providing a method and a handling and transporting apparatus of the type referred to in the introduction, with which containers are held or transported in a wide range of dimensions by the same gripping element without the effort of re-fitting being required and/or desired, and wherein it is further promoted or assured that the container remains undamaged or essentially undamaged or substantially undamaged, even if the gripping element engages at a region which was not intended, and wherein, additionally, the control effort at the transfer of the containers from one transporting element to the other following transporting element is also reduced.

SUMMARY

According to the present application, the object is solved by a method according to the present application, and, respectively by a handling and transporting apparatus for containers with the features according to the present application. Further embodiments of the present application are disclosed in the present application.

Attention is drawn to the fact that the features described individually in the following description can be combined with one another in any technically rational manner, and provide further embodiments of the present application. The description additionally characterizes and specifies the present application in connection with the figures.

According to the present application, a handling and transporting apparatus comprises at least one gripping element for holding or gripping a container, wherein the container comprises a belly or body region, at the head end a closable mouth aperture, and a neck region, and wherein the apparatus comprises at least one transfer region from one transporting element to another transporting element. In at least one possible embodiment of the present application, provision is made for the gripping element to comprise at least two gripping fingers, which in each case comprise, for example, a rigid base element and in one possible embodiment a self-adaptive gripping region, wherein the gripping region is arranged at the radially outside end of the base element, and wherein a control element is arranged at the end of the base opposite to this, and that force introduction elements are arranged at the gripping region, spaced at a distance from the base, in relation to the control element in such a way that the control element is in contact with a control rail arranged in the transfer region, wherein the force introduction elements are in one possible embodiment arranged opposite to this, on the side of the control rail.

Accordingly, with the present application, a handling and transporting apparatus for containers is provided with which containers in a wide range of dimensions can be held or transported with the same gripping element, without the effort of re-fitting being incurred at a change of container, and whereby it is further ensured and/or promoted that the container remains undamaged, even if the gripping element engages at an unintended region. Since the gripping element, i.e. in one possible embodiment the gripping region, is self-adaptive in one possible logical manner, i.e. engages around the container being adapted to its dimensions, but with sufficient force to hold it and transport it, it is ensured and/or promoted that the container is not deformed, and wherein likewise the secure transport along the handling and transporting apparatus is achieved. In addition to this, due to the possible arrangement of the force introduction elements and of the control element in interaction with the control rail, the control effort at the transfer of the containers from one transporting element to the other following transporting element is substantially reduced, since in one possible embodiment the self-adaptive gripping region, due to the force introduction of the force introduction elements, moves into its takeover or handover position, in that the control element is in contact quasi in the form of an abutment on the side of the control rail, and thereby forces the force introduction elements in contact on the opposite side of the control rail to introduce the necessary and/or desired actuation force for the self-adaptive changing of the position of the gripping region.

In a purposeful embodiment, the gripping region can be designed in the form of an arrowhead, or conical with its broad base and an opposing free end. The free end can run to a tip or be designed as truncated. It is purposeful if, moving outwards from the base, in each case the outer flank and the inner flank in the direction towards the free end, wherein jointed brace elements are provided, which in one possible embodiment extend parallel or substantially parallel to the base, running between both flanks. The braces connect the flanks in a jointed manner, wherein the flanks form alternating pulling or pushing flanks. In this way a body structure is formed, which seen from above can be opened on its upper and lower sides, and is closed in casing fashion at its working surfaces. It is of course possible for the upper side and/or under side to be covered with appropriate material.

In at least one possible embodiment of the present application, as already mentioned earlier, the gripping region may be in contact with its base with the base element. For example, the base element could be arranged at a transport star element, wherein the free end of the gripping region is oriented away from the transport star element. For this purpose, the base element can be designed with a securing element, which can easily be connected to a corresponding counter-securing element of the star element. In one possible embodiment, the base element exhibits a pivot axis, such that the gripping element, i.e. the base element with the gripping region, can pivot about this. Accordingly, the gripping region can come in contact either with its outer flank or with its inner flank with the force introduction element concerned, such that the actuation force is introduced constantly or substantially constantly more strongly as the contact force increases.

The wrapping and gripping around a container or containers is, in the case of a self-adaptive gripping finger, additionally induced by the contour of the container itself.

As already described, in one possible embodiment, the gripping region is self-adaptive. In the meaning of the present application, this signifies that, upon contact with a container, for example upon contact with a bottle, a pressure force is exerted onto the corresponding inner flank of the gripping region, wherein the contact region of the gripping region deflects the pressure force, and the free end, as well as the base, i.e. the contact-free regions of the gripping region, move in each case mutually opposed in the direction towards the container. A movement in the same direction in each case is carried out by the respective outer flank.

Accordingly, the container is held securely in position on its transport path. The gripping region in this situation adapts automatically to the respective diameter, such that containers of different dimensions can be held securely in position with the same gripping regions in each case. The same effect also occurs, however, with the contact of the inner and outer flanks with the force introduction elements concerned, in order to reach the holding position, the handover or takeover position, or the intermediate position, wherein the force introduction elements can also be designated as stops.

In at least one possible embodiment, the gripping element is formed from a pair of opposed gripping fingers, which in each case comprise the base element and the gripping region, i.e. the self-adaptive gripping region in each case, wherein the gripping region is oriented with its respective inner flank to the inner flank of the respective gripping region allocated to it. Related to a mirror axis, the two gripping fingers are arranged in mirror image to one another. This signifies, in the meaning of the present application, that the gripping fingers, seen from above as quasi L-shaped, are oriented mutually opposed with their base element designed as a transverse web. Accordingly, one of the gripping fingers is running forwards in the transport direction, while the other gripping finger of the pair is running backwards.

It is possible that within the transfer region, one of the self-adaptive gripping regions in each case must be or should be transferred into the sickle-shaped takeover position or handover position, while the other gripping region may be arranged in an intermediate position.

Purposefully, the control rail is arranged in a fixed position in the transfer region, and designed as slightly curved. When the forwards running gripping finger now reaches this, the control element comes in contact with the control rail. The control element, in a suitable embodiment as a guide roller, be designed in the form of a bearing-mounted roller wheel, and roll along the guide rail. From running in the forwards direction, the control element passes first onto the control rail, with, following this, first the outer force introduction element comes in contact with the side of the control rail opposite to the control element, such that the outer force introduction element introduces the necessary and/or desired force to open or release the self-adaptive gripping region from the holding position. The self-adaptive gripping region is transferred in this situation into the sickle-shaped opening position. With regard to the following gripping finger, correspondingly, the inner force introduction element first comes in contact with the control rail, such that the necessary and/or desired force for opening is introduced into the inner flank, such that the self-adaptive gripping region is transferred into the sickle-shaped opening position. For the takeover or handover, however, it may be only necessary and/or desired for the gripping region to be arranged in the sickle-shaped opened position.

It is possible if the control rail of the transfer region is designed in its extension in such a way that one of the gripping fingers is in contact with the control rail, such that also one of the gripping regions is arranged in the sickle-shaped opened position. The other gripping region is then arranged in the intermediate position, in which the gripping region is arranged with its mid-axis running linear, i.e. straight. Naturally, the control rail can also be arranged in its extension in such a way that gripping fingers of the pair concerned are in contact with the control rail, such that then both gripping regions are in the sickle-shaped opened position, wherein, however, the free ends are curved in possible effect oriented mutually opposed to one another.

It is purposeful if another accommodation element is provided for, at which the container held or arranged between the two gripping fingers is in contact. The accommodation element can exhibit a correspondingly rounded indentation for this purpose.

The accommodation element can also be designed in such a way that it conveys the container out of the gripping element, while, due to the force effect of the container, the self-adaptive gripping region deviates accordingly. Also supported or implemented is the opening of the gripping regions, by means of the interacting components, i.e. the control rail, the control element, and the force introduction elements.

It is purposeful if the respective transporting element also has a stationary guide track, on which the control elements are moved and relative to it, i.e. can roll on it. In this way the situation is possibly reached that the gripping regions self-adaptively remain in the holding position due to the force introduction of the force introduction elements and/or of the container into the inner flank. The gripping fingers are purposefully in one possible embodiment connected by way of the base elements to the transporting element and are moved together with this, such that in each case the relative movement is derived on the one hand to the control rail and on the other to the guide track, such that the corresponding effect is exerted onto the self-adaptive gripping regions. The stationary guide track is in one possible embodiment circumferential, but in the transfer region exhibits an interruption, because the control rail is arranged here.

Hereinafter the opened position is designated on the one hand as the accommodation position or takeover position and on the other as the handover or takeover position. In the accommodation position, the two gripping fingers take over a container in a slide-in unit, wherein the first gripping region is curved in sickle form, and transports it along the transport direction to a slide-out unit, in which an output position is provided, in which the other gripping region is curved in sickle shape, and the first is arranged in the intermediate position. Between the takeover and the handover, the gripping regions are naturally arranged in the holding position. In at least one possible embodiment of the present application, the free ends, due to the sickle-shaped curving, release a large, quasi funnel-shaped slide-in or slide-out opening respectively, which the container is guided past without any interference, and in one possible embodiment can be slid in or out. It is therefore possible if the gripping element, for the release of the container, is moved by appropriate forces, in self-adaptive effect, into the takeover or handover position. This can be achieved with suitable force introduction elements, which take effect on the inner and outer flanks.

Due to the force introduction elements, the self-adaptive effect of the gripper is restricted, in one possible embodiment, if the gripper is formed as hardly resilient or not resilient. Accordingly, a improvement lies in the increasing of the self-adaptive function and effect, and to make increased use of the container as a shape-changing stop, with either at least the inner force introduction element is mounted such as to be displaceable against a spring force by the pivoted gripping fingers, or if an intermediate element, flexible within narrow limits, is provided between the base element and the control element, or the base element is itself designed to be flexible, for example due to its being made of a flexible material. In this way, an increased self-adaptive adaption to different bottle diameters is possible.

It is possible, however, with suitable means, e.g. by means of the accommodation element, for the container to be guided out of the surrounding gripping elements. The pressure force of the emerging container on the inner flank can then cause the corresponding deformation of the gripping element against the holding position. Due to this introduction, the container comes in contact with the respective inner flank, such that at least both free ends again move towards each other, such that the container can be transported in a secure position. In this situation the actuation force is effected by the rolling of the control elements along the stationary guide track, while the gripping fingers, pivoted about the pivot axis, are pushed to the force introduction elements, such that the containers are held in a secure position along the transport path. As an alternative, a comparable linear displaceable mounting can of course be provided for, which in an analogous manner guides the gripping finger into contact with the force introducing elements or stop elements.

It is possible, if the gripping element, i.e. the gripping region, doing without a drive element or force introduction element, in other words only or substantially only by means of the force introduction of the container sliding in and out, comes in contact in each case self-adaptively with the desired holding region, or, respectively, moves into the takeover or handover position, into the holding position, or into the intermediate position, which is achieved by the interaction of the components, i.e. by the interaction of the guide track and the control element.

In at least one possible embodiment of the present application, the self-adaptive gripping element can adapt to differently dimensioned holding regions, such that minor or even extensive re-fitting and/or adjustment work can be done away with.

The gripping elements can engage either at the mouth region of the container, i.e. in the neck region, the throat region, or the belly or body region, wherein, however, it is also possible for all or substantially all or most or some other regions of the container to be engaged by the gripping elements.

At least the inner flanks, but of course also the outer flanks, can be made of suitable material, such as, in one possible embodiment a rubber material, such as polyurethane (PU), hydrated acrylonitrile butadiene rubber (HNBR), or ethylene propylene diene monomer (EPDM), etc., which exhibit a high coefficient of friction. Depending on the individual holding and transport task, however, spring steels or soft plastics such as polyvinylidene difluoride (PVDF) are possible.

In a possible embodiment, at least the inner flanks can be formed in layer fashion, wherein two or more layers can be provided for. For example, the side facing the interior of the body, i.e. the inner or innermost layer, can exhibit elevations and depressions, in order to achieve improved mobility, i.e. reaction to the pressure forces taking effect. It is also possible, however, for the inner or, respectively, innermost layer to be designed as more extendable or flexible than the layer which is directly in contact with the container.

In a further possible embodiment variant, which, if appropriate, is to be combined with one or more of the aforementioned elements, at least the inner flank of one or both gripping fingers is divided radially into two or more sections. In this situation, the radially inner first section is at least partially covered with a harder and/or more rigid material, or formed from this (spring steel, polyethylene terephthalate (PET), polyether ether ketone (PEEK), etc.), than the radially outer section (tip of the gripping finger), which is formed at least partially from a softer or more elastic material, such as, for example, a rubber material, such as PU, EPDM, HNBR, fluororubber (FPM, FLM or FKM), etc., or also a suitable plastic.

Accordingly, in the radially outer tip of the gripping finger, when gripping an object, the self-adaptive effect comes more strongly into play, wherein the heavily friction-stress mechanical region of contact with the force introduction region, or stop elements of the gripping fingers, is exactly or substantially exactly or generally optimized for this purpose.

This radial section formation can also be achieved by different material thicknesses of the gripping finger flanks, for example with the material thickness of the gripping finger flank in the radial direction decreasing from the inside to the outside, continuously or in sections.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Further embodiments are disclosed in the present application and the following description of figures. These show:

FIG. 2 shows a pair of gripping fingers as a unit, in which the gripping finger running forwards is in contact with the control rail, in a view from above;

FIG. 3 shows the pair of gripping fingers from FIG. 2 as detail, in a side view;

FIG. 6 shows the pair of gripping fingers with gripping regions in the holding position, in a view from above; and FIG. 7 shows the situation from FIG. 6 in a side view.

DESCRIPTION OF EMBODIMENT OR EMBODIMENTS

In the different figures, the same parts are provided with the same reference numbers, for which reason they are also described once.

Figure 1:
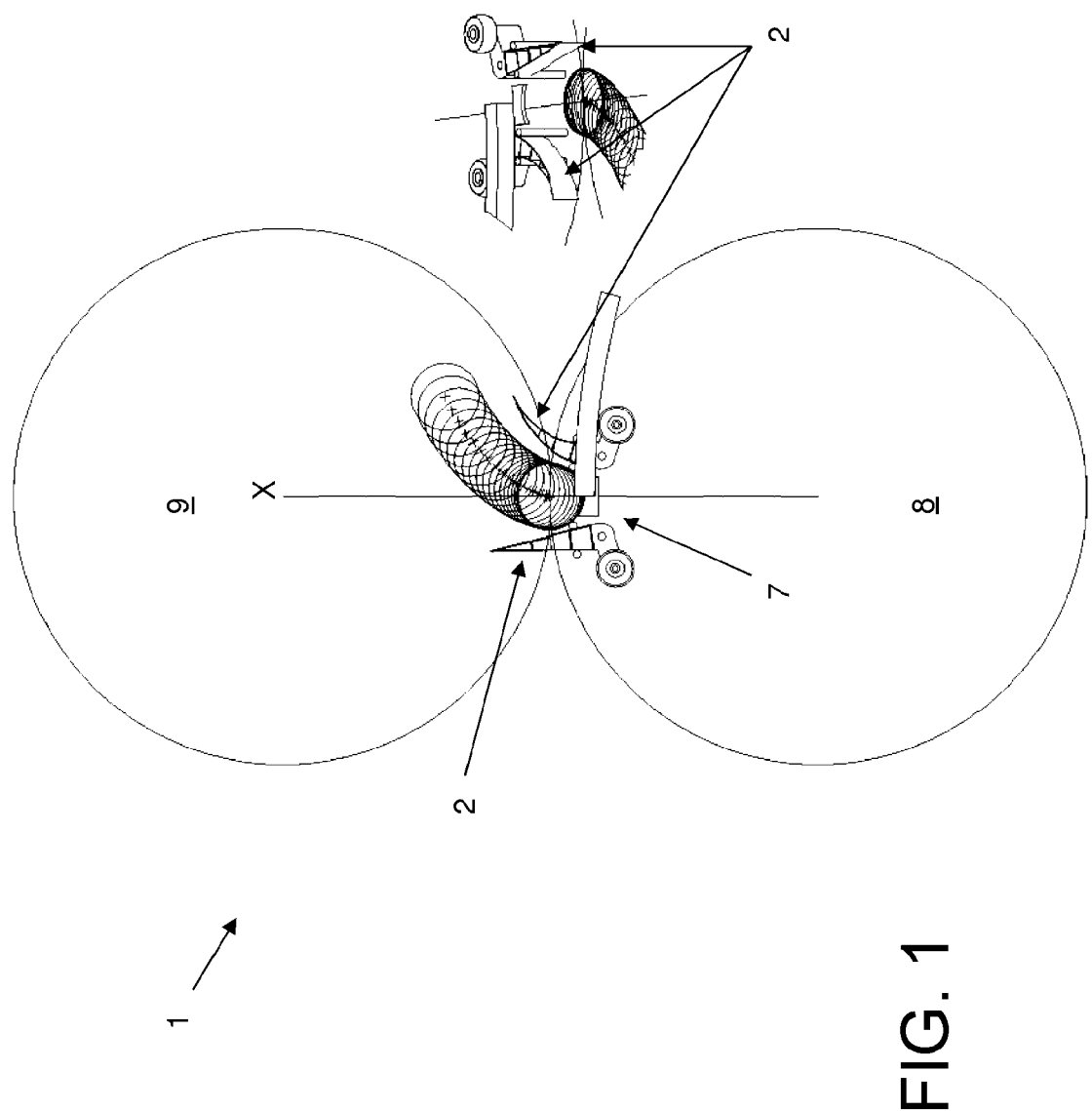
FIG. 1 and FIG. 1A show the principle of a container and transporting apparatus in a view from above.

FIG. 1 shows a handling and transporting apparatus 1 with two transporting elements 8, 9 in the form of transport star elements or transport wheels, rotating about a vertical axis, which comprise a plurality of circulating and, in one possible embodiment, self-adaptive gripping elements 2 for the holding or gripping of a container 3 in each case, wherein the container 3 comprises a belly region 4, and at the head end, a closable mouth opening 5, and a neck region 6 (FIG. 3), and wherein the apparatus 1 comprises at least one transfer region 7 from one transporting element 8 to another transporting element 9. The bottles, represented by a plurality of circles, illustrate the movement track of a bottle which is to be immersed relative to the star 8. In this situation, overall in connection with this solution, the term "transporting element" can also be understood to mean a handling apparatus such as a filler, closer, rinser, or the like.

In at least one possible embodiment of the present application, provision is made in the example shown for the gripping element 2 to comprise two opposed and identically designed gripping fingers 2.1 and 2.2, which in each case comprise a rigid base element 10 and a possibly self-adaptive gripping region 11, wherein the self-adaptive gripping region 11 is arranged with its base 12 at the radially outer end of the base element 10. Arranged at the opposite end of the base element 10 is a control element 13, here in the form of a bearing-mounted rolling wheel, which, in interaction with a control rail 16, arranged in the transfer region 7, allows for the pivot movement of the respective gripping finger 2.1 and 2.2. In this situation, arranged on the transporting element 8 at the height of the self-adaptive gripping region 11 and at a distance from the base 12 are circulating force introduction elements 14, 15, arranged in relation to one another in such a way that, at a pivot movement of the gripping finger 2.1 or 2.2 by means of the control element 13 and the base element 10, by interaction with the control rail 16 arranged in the transfer region 7, a side of the self-adaptive gripping region 11 is pressed against one of the force introduction elements 14 or 15, and therefore, depending on the previous pivot movement about the base 12, completes a sickle-shaped opening or closing movement and/or opening or closing deformation, relative to the opposite gripping finger 2.1 or 2.2, and in at least one possible embodiment completely independently and disassociated from the position and/or movement of the other gripping finger 2.1 or 2.2. The force introduction elements 14, 15 accordingly represent passive stops. Each gripping finger 2.1 and 2.2, i.e. the respective base element 10, in one embodiment variant, is mounted on bearings such as to be capable of pivoting about a pivot axis.

To further explain, in at least one possible embodiment, such as shown in FIG. 2, the leading control element 13, which is essentially a cam roller, in the direction of rotation, contacts the control rail 16 and is displaced inwardly away from the perimeter of the transport element 8. This displacement results in a pivoting about the bearing axis 27, thereby causing the gripping finger 2.1 to be pressed into the force introduction element 14, which is essentially a post or rod or bar. The pressing of the gripping finger 2.1 against the post 14 causes a deformation of the gripping finger 2.1 such that the gripping finger 2.1 essentially bends or curves or curls around the post 14. An opposite bending or curving movement can be generated by the guide track 26, such as shown in FIG. 6. In this case, the guide track 26 displaces the control element 13 outwardly toward the perimeter of the transport element 8 and thereby pivots the gripping finger 2.1 into the other force introduction element 15, which is also essentially a post or rod or bar. In this manner the gripping fingers 2.1, 2.2 can be caused to either bend or curve or curl away from a container to be held, such as shown in FIG. 2, or toward or about a container to be held, such as shown in FIG. 6.

Figure 1A:
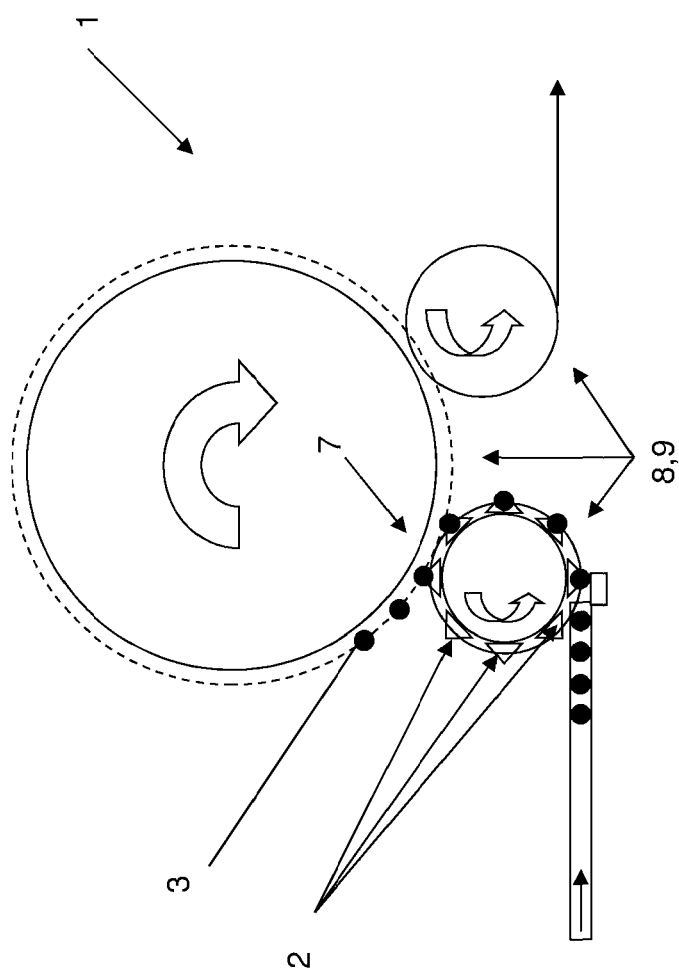

The container 3 is represented in FIG. 1 symbolically as an array of adjacent circles, in order to indicate a movement track in the form of circular sections of the container into the gripping element 2, and/or out of this, such as can be seen, for example, in FIG. 2, on the basis of the broken line I. The transporting elements 8 or 9 can be designated as an inlet star element, main star element, or outlet star element. FIG. 1a shows the handling and transporting apparatus 1 with an inlet star element, a main star element, and an outlet star element. The gripping elements 2 are represented in principle as unfilled triangles. The containers are conducted to the inlet star element via a linear conveyor or another transport star element.

As represented, the gripping element 2 is formed from two gripping fingers 2.1 and 2.2 respectively, which are of identical design and arranged opposite each other, as well as being arranged mirror-symmetrically in relation to a mirror axis indicated as X in FIG. 1, such that a pair of gripping fingers is formed, of which a plurality are provided for at the handling and transporting apparatus.

Hereinafter one of the gripping fingers 2.1 or 2.2 is described, wherein the other, as already said, is of identical or substantially identical design.

The gripping finger comprises the base element 10 and the self-adaptive gripping region 11. The gripping region 11 seen from above is designed as conical in shape, and comprises the base 12 and a free end 17, designed for example with a pointed tip. Connected to the base 12 is the gripping region 11 with the base element 10. Arranged opposite the gripping region 11 is the control element 13. The control element 13 is designed, for example, as a bearing-mounted roller. The respective gripping region 11 comprises an inner flank 18 and an outer flank 19, whereby the inner flank 18 is oriented towards the other gripping finger. Arranged between the flanks 18 and 19 are jointed braces 20.

The force introduction elements 14 and 15 are arranged, in the direction towards the free end 17 remote from the base 12, one at the inner flank 18 and the other at the outer flank 19.

Figure 5:
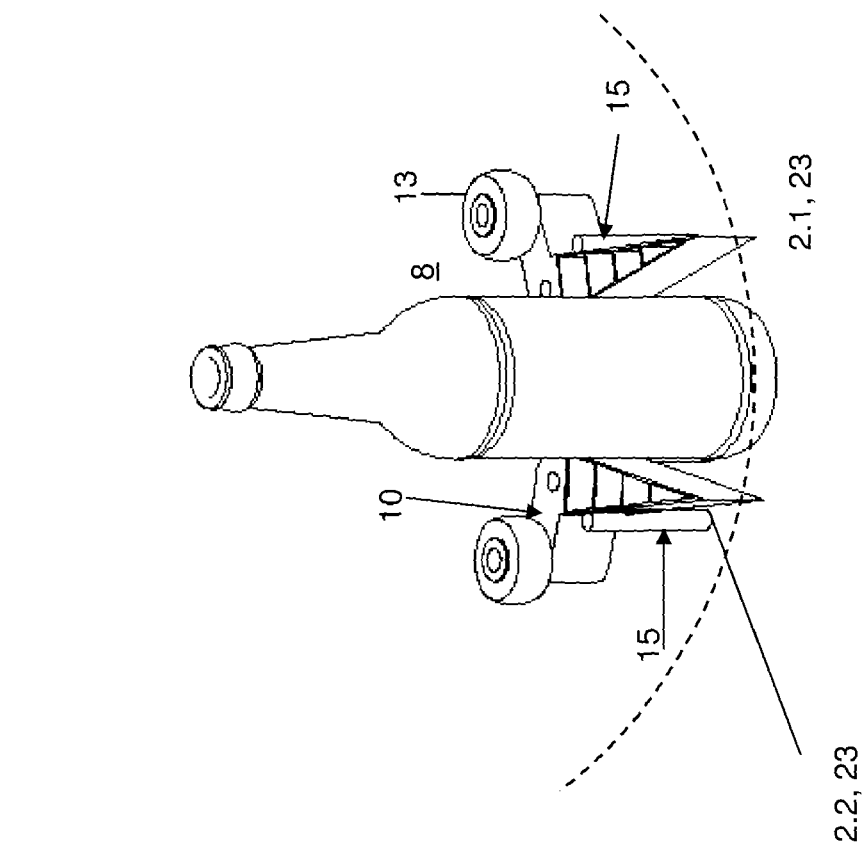
FIG. 5 shows the situation from FIG. 4 in a side view.

The gripping region 2 can be steplessly transferred by force effect into a holding position 21 (FIG. 6) and into an opened position 22, i.e. into the takeover or handover position (FIGS. 2 and 3), wherein, between the extreme positions possible, 21 and 22, an intermediate position 23 (FIGS. 4 and 5) can be defined.

The control rail 16 is arranged in a fixed position in the transfer region 7, and designed as curved, corresponding to the star element diameter. Of the gripping finger 2.2 moving forwards, it is first its control element 13 which passes to the control rail 16, wherein, following this, it is first the outer force introduction element 15 on the side of the control rail 16 opposite to the control element 13 which first comes in contact with this, such that, as shown in FIGS. 2 and 3, the outer force introduction element 15 introduces the necessary and/or desired force to open or release the self-adaptive gripping region 11. This opening movement, of course, does not necessarily or substantially necessarily have to be provided, but it represents a possible variant, in order to allow for closer arrangements or for a steeper inlet angle of the containers. In this situation, the self-adaptive gripping region 11 is transferred into the sickle-shaped opening position 22. With the following gripping finger 2.1, accordingly, it is first the inner force introduction element 14 which comes in contact with the control rail 16, such that the force necessary and/or desired for opening is introduced into the inner flank 18, such that the self-adaptive gripping region 11 is transferred into the sickle-shaped opening position 22. For the takeover or handover, however, it may be necessary and/or desired for the gripping region 11 of the following gripping finger 2.1 to be arranged in the sickle-shaped opened position.

In FIGS. 1 to 3 the control rails 16 and 26 are not shown to scale throughout, relative to the container 3 and the grippers 2.1, 2.2.

In at least one possible embodiment of the present application, the control rail 16 is designed in its extension in such a way that one of the gripping fingers 2.1 or 2.2 is in contact with the control rail 16, such that, likewise, one of the gripping regions 11 is arranged in the sickle-shaped opened position 22. The other gripping region 21 is then arranged in the intermediate position 23, in which the gripping region 11 is arranged with its mid-axis linear, i.e. running straight. The control rail 16 can of course also be designed in its extension such that gripping fingers 2.1 and 2.2 of the pair concerned are in contact with the control rail 16, such that both gripping regions 11 can then be in the sickle-shaped opened position, wherein, however, the free ends 17 are, with favorable effect, curved and oriented opposed to and away from each other.

Figure 4:
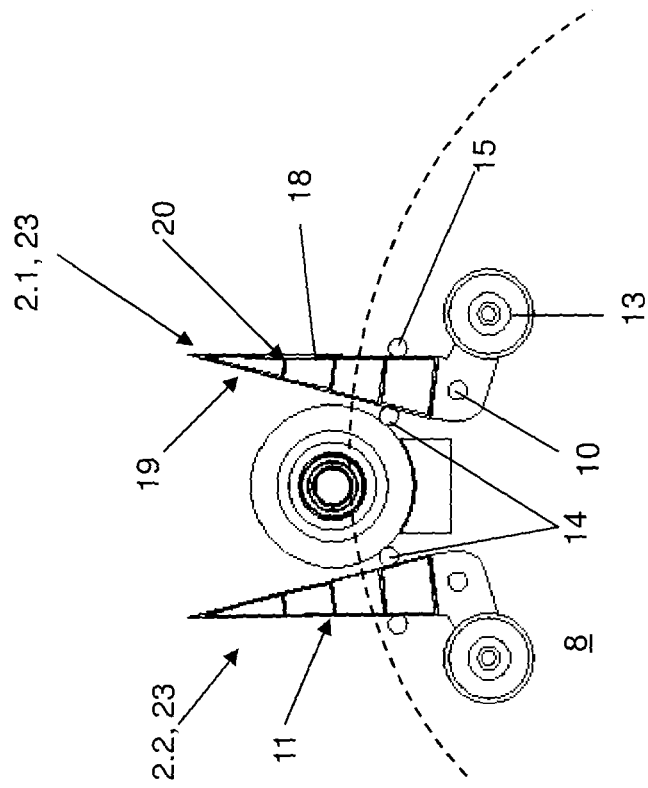
FIG. 4 shows the pair of gripping fingers with gripping regions arrange in an intermediate position, in a plan view.

As can be seen in FIGS. 2, 4 and 6, an accommodation element 24 is provided for, in contact with which is the container 3, held and arranged respectively between the two gripping fingers 2.1 and 2.2. The accommodation element 24 may also exhibit a shape 25 adapted according to the container contour.

Shown in FIGS. 6 and 7 is the arrangement that the respective transporting element 8, 9 also has a stationary guide track 26, at which the control elements 13 can move along relative to it, such as, for example, by rolling. The stationary guide track 26 is in one possible embodiment designed, and arranged in relation to the control elements 13, in such a way that the gripping elements 2, i.e. the gripping finger, comes in contact in each case with the force introduction elements located on the inside, such that the gripping region 11 is, for example, curved in sickle-fashion inwards. This may have the effect that the gripping regions 11 in self-adaptive manner, due to the force introduction of the force introduction elements 14, 15, and/or of the container 3 into the inner flank 18, remain in the holding position 21. The gripping fingers 2.1 and 2.2 are purposefully connected to the transporting element 8, 9, and are moved together with this, such that, in each case, the relative movement is derived on the one hand towards the control rail 16, and, on the other, towards the guide track 26, such that the corresponding effect is exerted on the self-adaptive gripping regions 11. The gripping regions 11 surround the belly region 4 of the container 3, wherein the free ends 17 are at a distance from the container 3. As can be seen in FIGS. 2 and 6, the control rail 16 causes a pivoting movement of the gripping finger in the opposite direction, like a pivoting movement due to the guide track 26, wherein the control element 13 is pushed by the control rail 16 towards the lower edge of the image in FIG. 2, while the guide track 26 causes a deflection directed upwards. In this way the different pivot directions are derived of the base element 10, which the gripping fingers 2.1 and 2.2 push towards the force introduction elements 14 or 15, such that the gripping fingers, i.e. the gripping regions 11, are transferred either to holding position (FIG. 6) or into the handover or takeover position (FIG. 2) when the contact with the force introduction element is established. If no contact is established, the gripping finger, i.e. the gripping region, is arranged in the intermediate position.

The dimensions shown in the figures are not to scale, as has already been mentioned with regard to the control rail 16. In one possible embodiment, provision can be made for the gripping fingers to be designed with such a dimension which falls within a range from one half to 1.5 times the diameter of the container, wherein the container diameter can be selected as the standard diameter with which the container and transporting apparatus usually carries out handling and transporting. The present application is of course not restricted to the embodiment represented. It is conceivable that the force introduction elements 14, 15 to be moved in or against the circumferential direction, such that the force for the deformation of the gripping fingers 2.1, 2.2 is introduced. It is possible for a suitable lever mechanism to be provided, which can be activated accordingly in the event of a pivoting movement of the base element 10 relative to the control element 13. It may of course not be necessary and/or desired for the gripping region to be self-adaptive, e.g. elastic. For example, if a spring steel were to be used in the gripping region, it would be possible for the self-adaptive property, i.e. elasticity, to be provided, for example, in the base element 10. To this extent, the entire gripping finger can be self-adaptive, e.g. elastic, and not only the gripping region or not only the base element. It would be possible, for example, with heavy containers and/or with fast-running systems, for the gripping region to be designed with relatively little flexibility, as a rigid gripping region.

In possible embodiments which are not shown, with closely confined installation space if appropriate, control elements 10 are provided for, which are arranged vertically at different heights and, correlating with these, the control rails 16 and 26 are likewise arranged at different height levels. A further improvement lies in the fact that at least two control elements 13 are arranged at a base part (10) of an individual gripping finger 2.1, 2.2, such that the individual pivot directions or the respective counter-movement can be introduced in a very confined space or short stretch.

The following patents, patent applications or patent publications, are hereby incorporated by reference as if set forth in their entirety herein except for the exceptions indicated herein: DE 10 2005 014 838 A1, assigned to Krones AG, published on Oct. 5, 2006; DE 10 2005 041 929, assigned to Krones AG, published on Mar. 8, 2007; DE 10 2007 037 228, assigned to Krones AG, published on Feb. 12, 2009; DE 198 08 058, assigned to Kronseder, published on Sep. 2, 1999; DE 198 30 456, assigned to Tretter Herrmann, published on Jun. 10, 1999; DE 20 2005 002 924, assigned to Krones AG, published on Mar. 30, 2006; EP 1 203 640, assigned to Kniese Lief, published on May 8, 2002; EP 1 040 999, assigned to Kniese Lief, published on Oct. 4, 2000; DE 10 2007 017 416, assigned to Festo AG & Co, published on Jun. 19, 2008; DE 10 2009 015 977, assigned to Festo AG & Co KG, published on Sep. 30, 2010; DE 10 2005 010 380, assigned to Fraunhofer Ges Forschung, published on Sep. 14, 2006; DE 203 18 845, assigned to Griesbach Volker, published on Mar. 25, 2004; and German Application No. 10 2011 013 299.6.

Method for transporting containers 3 with gripping action on a handling and transporting apparatus, and a handling and transporting apparatus which is designed to implement the method and has at least one gripping element 2 for retaining or gripping a container 3, wherein the container has a belly region, and at the head end a closable mouth opening and a neck region, and wherein the apparatus has at least one transfer region 7 from one transporting element (8, 9) to another transporting element 8, 9.

One feature or aspect of an embodiment is believed at the time of the filing of this patent application to possibly reside broadly in a method for transporting containers 3 with gripping action on a handling and transporting apparatus for containers 3, comprising at least one gripping element 2 for holding or gripping a container 3, and comprising at least one transfer region 7 from one transporting element 8, 9 to another transporting element 8, 9, wherein circulating force introduction elements 14, 15 are arranged on the transporting element 8, 9 at the height of the gripping region 11 and at a distance from the base 12 on both sides and in relation to one another in such a way that, at a pivoting movement of a gripping finger 2.1 or 2.2 by means of a control element 13 and a base element 10 by interaction with a control rail 16, 26 arranged in the transfer region 7, a side of the gripping region 11 is pressed against a force introduction element 14 or 15, and therefore, depending on a previous pivoting movement about the base 12, accomplishes a sickle-shaped opening or closing movement and/or opening or closing deformation.

Another feature or aspect of an embodiment is believed at the time of the filing of this patent application to possibly reside broadly in a handling and transporting apparatus for containers 3, arranged for carrying out the method, in the form of the transporting element 8, 9 circulating about a vertical axis, in star or wheel form, comprising at least the likewise circulating gripping element 2 for holding and gripping the container or containers 3, and comprising at least one transfer region 7 for transferring containers 3 from one transporting element 8, 9 to another adjacent transporting element 8, 9, wherein the at least one gripping element 2 comprises at least two gripping fingers 2.1; 2.2, which in each case comprise the base element 10 and the gripping region 11, wherein the gripping region 11 is arranged with its base 12 at the end of the base element 10 lying radially outside, wherein the control element 13 is arranged at the opposing end of the base element 10, wherein the base element 10 is mounted so as to pivot about a vertical axis or mounted so as to be linear displaceable, and, further, are arranged in the circumferential direction, together with the gripping region 11 of the gripping fingers 2.1, 2.2, radially outwards at a distance from the base 12, with circulating force introduction elements 14, 15, and, further, non-circulating control rails 16, 26 are arranged in the transfer region 7 in such a way that at least one control element 13 of a gripping finger 2.1, 2.2 can be brought into contact with these, and, as a result, the base element 10, depending on the relative position of the control rails 16, 26 can be pivoted towards the respective control element 13 or linear displaced.

Yet another feature or aspect of an embodiment is believed at the time of the filing of this patent application to possibly reside broadly in the handling and transporting apparatus, wherein the base element 10 is arranged at the transporting element 8, 9, and comprises two transfer regions.

Still another feature or aspect of an embodiment is believed at the time of the filing of this patent application to possibly reside broadly in the handling and transporting apparatus, wherein the gripping element 2 is formed from a pair of gripping fingers 2.1, 2.2 arranged opposite one another, which are mutually opposed.

A further feature or aspect of an embodiment is believed at the time of the filing of this patent application to possibly reside broadly in the handling and transporting apparatus, wherein the gripping region 11 has self-adaptive properties, in one possible embodiment in that the gripping fingers 2.1, 2.2 are self-adaptive gripping fingers, or in that the base element 10 is formed at least partially elastic or comprises an elastic material.

Another feature or aspect of an embodiment is believed at the time of the filing of this patent application to possibly reside broadly in the handling and transporting apparatus, wherein the gripping element 2 is designed with its base element 10 and its gripping region 11 in an L-shape, wherein the base element 10 forms a transverse web, arranged at which is the base 12 of the gripping region 11.

Yet another feature or aspect of an embodiment is believed at the time of the filing of this patent application to possibly reside broadly in the handling and transporting apparatus, wherein at least two control elements 13 are arranged vertically at different heights and, correlating with this, likewise at least two control rails 16 are arranged at different height levels.

Still another feature or aspect of an embodiment is believed at the time of the filing of this patent application to possibly reside broadly in the handling and transporting apparatus, wherein at least two control elements 13 are arranged at a base part 10 of a gripping finger 2.1, 2.2.

A further feature or aspect of an embodiment is believed at the time of the filing of this patent application to possibly reside broadly in the handling and transporting apparatus, wherein the control rails 16 has such an extension that one of the gripping fingers 2.1, 2.2 of the gripping element 2 is in contact with the control rail 16.

Another feature or aspect of an embodiment is believed at the time of the filing of this patent application to possibly reside broadly in the handling and transporting apparatus, wherein the control element 13 is designed as a roller.

Yet another feature or aspect of an embodiment is believed at the time of the filing of this patent application to possibly reside broadly in the handling and transporting apparatus, comprising an accommodation element 24, which is arranged between gripping fingers 2.1, 2.2 of the gripping element 2.

Still another feature or aspect of an embodiment is believed at the time of the filing of this patent application to possibly reside broadly in the handling and transporting apparatus, wherein the transporting element 8, 9 comprises a stationary guide track 26, on which the control element 13 is moved along relative to it when the transporting element 8, 9 is moved in the transport direction, wherein the gripping fingers 2.1, 2.2 are arranged in a holding position 21.

A further feature or aspect of an embodiment is believed at the time of the filing of this patent application to possibly reside broadly in the handling and transporting apparatus, wherein the gripping region 11 is designed from its base 12 to its free end 17 as conical or tipped.

One feature or aspect of an embodiment is believed at the time of the filing of this patent application to possibly reside broadly in the handling and transporting apparatus, wherein the gripping region 11 comprises an outer flank 19 and an inner flank 18, between which jointed braces 20 are arranged.

Another feature or aspect of an embodiment is believed at the time of the filing of this patent application to possibly reside broadly in the handling and transporting apparatus, wherein the gripping region 11 is designed at least at its inner flank 18 as multilayered, wherein, at least at its inner flank 18, this is more expandable at its inner layer than a layer which is in contact with the container 3, and wherein the gripping region 11, at least at its inner flank 18, exhibits elevations and depressions on its inner layer.

Yet another feature or aspect of an embodiment is believed at the time of the filing of this patent application to possibly reside broadly in a method for transporting containers using a transport arrangement, said method comprising the steps of: moving a movable transport element and thereby moving at least one gripping element supported thereon, each said at least one gripping element comprises at least a first gripping finger and a second gripping finger; and at least one of (A) and (B): (A) exerting a force at a first side of said first gripping finger using a force introduction arrangement mounted to move with said movable transport element, and thereby deforming said first gripping finger by bending or curving said first gripping finger away from said second gripping finger, and thereby increasing space between a distal portion of said first gripping finger and a distal portion of said second gripping finger to facilitate receipt of a container into each said at least one gripping element, or release of a container out of each said at least one gripping element; and (B) exerting a force at a second side of said first gripping finger using a force introduction arrangement mounted to move with said movable transport element, and thereby deforming said first gripping finger by bending or curving said first gripping finger toward said second gripping finger, and thereby decreasing space between a distal portion of said first gripping finger and a distal portion of said second gripping finger to facilitate gripping of a container by each said at least one gripping element.

A further feature or aspect of an embodiment is believed at the time of the filing of this patent application to possibly reside broadly in a transport arrangement for transporting containers, said transport arrangement comprising: a movable transport element; at least one gripping element being supported on said movable transport element; each said at least one gripping element comprises at least a first gripping finger and a second gripping finger; said movable transport element being configured to move to thereby move said at least one gripping element; each of said gripping fingers comprises a first side, a second side, and a distal portion; at least one force introduction arrangement mounted to move with said movable transport element and configured to at least one of (A) and (B): (A) exert a force at said first side of said first gripping finger, and thereby deform said first gripping finger by bending or curving said first gripping finger away from said second gripping finger, and thereby increase space between said distal portion of said first gripping finger and said distal portion of said second gripping finger to facilitate receipt of a container into each said at least one gripping element, or release of a container out of each said at least one gripping element; and (B) exert a force at a second side of said first gripping finger, and thereby deform said first gripping finger by bending or curving said first gripping finger toward said second gripping finger, and thereby decrease space between said distal portion of said first gripping finger and said distal portion of said second gripping finger to facilitate gripping of a container by each said at least one gripping element.

The components disclosed in the patents, patent applications, patent publications, and other documents disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, patent applications, patent publications, and other documents either incorporated by reference or not incorporated by reference.

All of the patents, patent applications, patent publications, and other documents, except for the exceptions indicated herein, which were cited in the German Office Action dated Jan. 22, 2013, and/or cited elsewhere, as well as the German Office Action document itself, are hereby incorporated by reference as if set forth in their entirety herein except for the exceptions indicated herein, as follows: DE 10 2005 014 838, having the title "Klammer zum Halten von Gefässen," published on Oct. 5, 2006; DE 10 2005 010 380, having the title "Finger-like gripping device, comprising several lateral elements movable joined with transversal elements and springs," published on Sep. 14, 2006; DE 10 2007 017 416, having the title "Sorting device e.g. for sorting coins, has one end suspended in sorter of suspension area and device has two sides in one of two mutual areas based on suspension area in direction of opening," published on Jun. 19, 2008; DE 198 08 058, having the title "Bottle gripper," published on Sep. 2, 1999; DE 10 2005 041 929, having the title "Greifer für Behälter," published on Mar. 8, 2007; DE 10 2007 037 228, having the title "Device and method for gripping containers," published on Feb. 12, 2009; DE 10 2009 015 977, having the title "Drive device," published on Sep. 30, 2010; DE 203 18 845, having the title "Multi-purpose holding device, comprising handle attached to long flexible strips with rigid bridges between them," published on Mar. 25, 2004; DE 20 2005 002 924, having the title "Klammergreifer für ein Gefässtransportsystem," published on Mar. 30, 2006; EP 1 040 999, having the title "Load carrying element with flexible outer skin," published on Oct. 4, 2000; and EP 1 203 640, having the title "Device for taking up forces, with a flexible outer skin," published May 8, 2002.

All of the patents, patent applications, patent publications, and other documents, except for the exceptions indicated herein, which were cited in the International Search Report dated Dec. 6, 2013, and/or cited elsewhere, as well as the International Search Report document itself, are hereby incorporated by reference as if set forth in their entirety herein except for the exceptions indicated herein, as follows: U.S. Pat. No. 5,743,377, having the title "Transport star for containers," published Apr. 28, 1998; DE 296 07 868, having the title "Transportstern für Gefäss," Jun. 5, 1997; and U.S. Pat. No. 4,651,879, having the title "Automatic bottle sorting system," published on Mar. 24, 1987.

The corresponding foreign and international patent publication applications, namely, Federal Republic of Germany Patent Application No. 10 2012 017 048.3, filed on Aug. 29, 2012, having inventor Andreas FAHLDIECK, and DE-OS 10 2012 017 048.3 and DE-PS 10 2012 017 048.3, and International Application No. PCT/EP2013/002389, filed on Aug. 9, 2013, having WIPO Publication No. WO 2014/032762 and inventor Andreas FAHLDIECK, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications, patent publications, and other documents, except for the exceptions indicated herein, are hereby incorporated by reference as if set forth in their entirety herein except for the exceptions indicated herein.

The purpose of incorporating the corresponding foreign equivalent patent application(s), that is, PCT/EP2013/002389 and German Patent Application 10 2012 017 048.3, is solely for the purposes of providing a basis of correction of any wording in the pages of the present application, which may have been mistranslated or misinterpreted by the translator, and to provide additional information relating to technical features of one or more embodiments, which information may not be completely disclosed in the wording in the pages of this application.

Statements made in the original foreign patent applications PCT/EP2013/002389 and DE 10 2012 017 048.3 from which this patent application claims priority which do not have to do with the correction of the translation in this patent application are not to be included in this patent application in the incorporation by reference.

Any statements about admissions of prior art in the original foreign patent applications PCT/EP2013/002389 and DE 10 2012 017 048.3 are not to be included in this patent application in the incorporation by reference, since the laws relating to prior art in non-U.S. Patent Offices and courts may be substantially different from the Patent Laws of the United States.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the embodiments therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, patent publications, and other documents, are not considered to be incorporated by reference herein for any of the patents, patent applications, patent publications, and other documents cited herein.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL LIST OF NOMENCLATURE

1 Handling and transport apparatus
2 Gripping element/gripping finger 2.1 and 2.2
3 Container
4 Belly region
5 Mouth opening
6 Neck region
7 Transfer region
8 Transporting element
9 Transporting element
10 Base element
11 Gripping region
12 Basis
13 Control element
14 Force introduction element
15 Force introduction element
16 Control rail
17 Free end
18 Inner flank
19 Outer flank
20 Jointed braces
21 Holding position
22 Opened position
23 Intermediate position
24 Accommodation element
25 Indentation
26 Guide track
27 Bearing axis of 13

What is claimed is:

1. A method for transporting containers using a handling and transporting apparatus comprising two transporting elements, and a gripping element and force introduction elements disposed on one of said transporting elements, said method comprising the steps of:
- transporting a container between said transporting elements at a transfer region by opening said gripping element and either releasing or receiving said container;
- closing said gripping element and gripping said container upon receiving said container; and
- said steps of opening and closing comprising:
  - engaging a control element of at least one gripping finger of said gripping element with a control structure disposed in said transfer region, and thereby pivoting a base element of said at least one gripping finger; and
  - upon pivoting, pressing a gripping region of said at least one gripping finger against one of a pair of said force introduction elements disposed on opposite sides of a base portion of said gripping region adjacent said base element, and thereby deforming said gripping region into a sickle shape.

2. The method according to claim 1, wherein:
said base element is mounted on its transporting element;
said step of transporting said container comprises transporting said container at two transfer regions; and
said control structure comprises a control rail.

3. The method according to claim 2, wherein:
said gripping element comprises a pair of said gripping fingers disposed opposite one another;
said gripping region is self-adaptive such that said gripping fingers are self-adaptive gripping fingers, or said base element is at least partially elastic or comprises an elastic material; and
said base element and said gripping region are disposed transversely in an L-shape, wherein said base element forms a transverse web, arranged at which is a base portion of said gripping region.

4. The method according to claim 3, wherein:
said control elements of said gripping fingers are disposed at different vertical positions;
said handling and transporting apparatus comprises at least one additional control rail, disposed at a different vertical position than said control rail, which control rails correspond to said control elements;
said control rails are configured and disposed such that said control element of only one of said gripping fingers of said gripping element is in contact with said control rail;
said method further comprises contacting said control element of only one of said gripping fingers of said gripping element with said control rail and thereby deforming said gripping region of only one of said gripping fingers into a sickle shape;
each of said control elements comprises a roller;
said handling and transporting apparatus comprises an accommodation element disposed between said gripping fingers of said gripping element;
one of said transporting elements comprises a stationary guide track configured to engage with said control elements;
said gripping region comprises a conical or tipped shape;
said gripping region comprises an outer flank, an inner flank, and jointed braces disposed between said flanks;
said gripping region comprises layers, at least at its inner flank, wherein an inner layer is more expandable than an outer layer which is in contact with the container, and wherein said inner layer exhibits elevations and depressions; and said method further comprises:
said step of gripping said container comprises holding said container against said accommodation element; and
said step of closing said gripping element comprises engaging said control elements of both of said gripping fingers with said stationary guide track, and thereby pivoting each of said base elements and deforming each of said gripping fingers toward one another and into contact with said container.

5. The method according to claim 1, wherein:
said gripping region comprises a flexible outer flank, a flexible inner flank, and braces disposed between and transverse to said flanks;
each of said flanks has a first end and a second end, wherein said first ends are spaced apart from one another and joined to said base element, and said second ends are disposed closer to one another than said first ends, such that said gripping region comprises a tapered shape;
said braces are of different lengths, wherein the length of said braces decreases in the direction from said first ends to said second ends of said flanks; and
said step of deforming said gripping region comprises bending or curving said flanks around said force introduction element, while also pivoting said braces with respect to said flanks.

6. A handling and transporting apparatus for handling containers according to the method of claim 1, said apparatus comprising:
two rotary transporting elements configured to transport a container therebetween at a transfer region;
at least one of said transporting elements comprising at least one gripping element and force introduction elements;
said at least one gripping element comprising at least two gripping fingers configured to grip containers therebetween;
each of said gripping fingers comprising: a base element, a gripping region connected to a first end of said base element, and a control element connected to a second end of said base element;
said force introduction elements being disposed in pairs on opposite sides of a base portion of said gripping region of each of said gripping fingers;
said first end of said base element being disposed outside of said second end of said base element in a radial direction;
said base element being pivotably mounted to permit pivoting, or being movably mounted to permit linear displacement;
at least one control structure being disposed in said transfer region and being configured to engage with said control element of at least one of said gripping fingers to pivot or displace said control element to press said gripping region against one of its pair of said force introduction elements, and thereby deform said gripping region into a sickle shape.

7. The handling and transporting apparatus according to claim 6, wherein:
said base element is mounted on its transporting element;
said transporting elements define two transfer regions; and
said control structure comprises a control rail.

8. The handling and transporting apparatus according to claim 7, wherein said gripping fingers of each gripping element are disposed opposite one another.

9. The handling and transporting apparatus according to claim 8, wherein said gripping region is self-adaptive such that said gripping fingers are self-adaptive gripping fingers, or said base element is at least partially elastic or comprises an elastic material.

10. The handling and transporting apparatus according to claim 9, wherein said base element and said gripping region are disposed transversely in an L-shape, wherein said base element forms a transverse web, arranged at which is a base portion of said gripping region.

11. The handling and transporting apparatus according to claim 10, wherein said control elements of said gripping fingers are disposed at different vertical positions.

12. The handling and transporting apparatus according to claim 11, wherein said handling and transporting apparatus comprises at least one additional control rail, disposed at a different vertical position than said control rail, which control rails correspond to said control elements.

13. The handling and transporting apparatus according to claim 12, wherein said control rails are configured and disposed such that said control element of only one of said gripping fingers of said gripping element is in contact with said control rail.

14. The handling and transporting apparatus according to claim 13, wherein each of said control elements comprises a roller.

15. The handling and transporting apparatus according to claim 14, wherein said handling and transporting apparatus comprises an accommodation element disposed between said gripping fingers of said gripping element.

16. The handling and transporting apparatus according to claim 15, wherein one of said transporting elements comprises a stationary guide track configured to engage with said control elements of both of said gripping fingers to thereby pivot each of said base elements and deform each of said gripping fingers toward one another and into contact with said container to grip said container.

17. The handling and transporting apparatus according to claim 16, wherein said gripping region comprises a conical or tipped shape.

18. The handling and transporting apparatus according to claim 17, wherein said gripping region comprises an outer flank, an inner flank, and jointed braces disposed between said flanks.

19. The handling and transporting apparatus according to claim 18, wherein said gripping region comprises layers, at least at its inner flank, wherein an inner layer is more expandable than an outer layer which is in contact with the container, and wherein said inner layer exhibits elevations and depressions.

20. The handling and transporting apparatus according to claim 6, wherein:
- said gripping region comprises a flexible outer flank, a flexible inner flank, and braces disposed between and transverse to said flanks;
- each of said flanks has a first end and a second end, wherein said first ends are spaced apart from one another and joined to said base element, and said second ends are disposed closer to one another than said first ends, such that said gripping region comprises a tapered shape;
- said braces are of different lengths, wherein the length of said braces decreases in the direction from said first ends to said second ends of said flanks; and
- said flanks are configured to bend or curve around said force introduction element, and said braces are configured to pivot with respect to said flanks, upon deformation of said gripping region.

* * * * *